US005471046A

United States Patent [19]
Meyers

[11] Patent Number: 5,471,046
[45] Date of Patent: Nov. 28, 1995

[54] CAMERA AUTO-FOCUSING SYSTEM WITH DESIGNATOR USING A VOLUME HOLOGRAPHIC ELEMENT

[75] Inventor: Mark M. Meyers, Hamlin, N.Y.

[73] Assignee: Eastman Kodak Company, Rochester, N.Y.

[21] Appl. No.: 201,597

[22] Filed: Feb. 25, 1994

[51] Int. Cl.$^6$ .................................................. G03B 13/36
[52] U.S. Cl. ............................. 250/201.7; 250/201.4; 354/409; 354/406
[58] Field of Search ........................... 250/201.7, 201.6, 250/201.5, 201.4, 201.2, 201.8, 204, 216, 226; 354/409, 407, 406, 404, 403, 402, 400; 359/15

[56] References Cited

U.S. PATENT DOCUMENTS

| | | | |
|---|---|---|---|
| 3,442,193 | 5/1969 | Pagel | 95/44 |
| 4,251,144 | 2/1981 | Matsuda et al. | 250/201.4 |
| 4,367,934 | 1/1983 | Matsui | 354/25 |
| 4,429,967 | 2/1984 | Tokuda et al. | 354/403 |
| 4,523,828 | 6/1985 | Kato | 354/403 |
| 4,595,810 | 6/1986 | Barnes | 250/201.4 |
| 4,600,831 | 6/1986 | Hutley | 250/201.4 |
| 4,601,574 | 7/1986 | Yamane et al. | 354/403 |
| 4,623,237 | 11/1986 | Kaneda et al. | 354/403 |
| 4,827,302 | 5/1989 | Takahashi | 354/403 |
| 4,829,171 | 5/1989 | Katsumura et al. | 354/201.4 |
| 4,862,442 | 8/1989 | Tadakoro et al. | 369/45 |
| 4,935,613 | 6/1990 | Ishiguro et al. | 250/201.1 |
| 4,945,529 | 7/1990 | Ono et al. | 369/109 |
| 4,977,457 | 12/1990 | Tamekuni et al. | 250/201.4 |
| 5,016,954 | 5/1991 | Onayama et al. | 350/3.71 |
| 5,039,183 | 8/1991 | Meyers | 359/17 |
| 5,070,509 | 12/1991 | Meyers | 372/45 |
| 5,161,139 | 11/1992 | Inoue et al. | 369/44.23 |
| 5,189,463 | 2/1993 | Capper et al. | 354/403 |
| 5,212,375 | 5/1993 | Goto et al. | 250/201.7 |
| 5,212,572 | 5/1993 | Krantz et al. | 359/15 |
| 5,239,335 | 8/1993 | Kato | 250/201.4 |
| 5,305,047 | 4/1994 | Hayakawa et al. | 354/403 |

FOREIGN PATENT DOCUMENTS

WO93/13452  7/1993  WIPO.

OTHER PUBLICATIONS

Sweatt, W. C.–*Designing and constructing thick holographic optical elements*. Applied Optics/vol. 17, No. 8 15 Apr. 1978, pp. 1220–1227.

Primary Examiner—Edward P. Westin
Assistant Examiner—John R. Lee
Attorney, Agent, or Firm—David A. Howley

[57] ABSTRACT

Apparatus for use with an imaging optical system, to indicate both the direction and magnitude of focus adjustment, includes a diffractive optical element exposed to a broad spectrum of radiation. The element filters out a narrow spectrum of the radiation and directs it into a path centered on detectors in a circuit that indicates the required focus adjustment. According to one feature of the invention, two detectors are used, and the focusing adjustment signal is determined by the difference in signal between the two detectors, eliminating absolute intensity and reflectivity from the focusing determination. Still another feature employs a holographic diffractive element transparent to most of the broad spectrum, but reflective in a narrow spectrum corresponding to detector sensitivity. This permits positioning of the holographic element between the optical system and its focal plane without significantly degrading the focused image. The focusing element can remain in position during imaging. The invention has particular utility when used in a camera having a visible designator.

27 Claims, 6 Drawing Sheets

CAMERA AUTO-FOCUSING SYSTEM WITH DESIGNATOR USING A VOLUME HOLOGRAPHIC ELEMENT

BACKGROUND OF THE INVENTION

1. Field of Invention

The invention relates to apparatus for providing focusing information to optical imaging devices, and more specifically to cameras including focusing mechanisms that use a narrow band of wavelengths for determining the proper focus adjustment. The invention has particular utility with a source of energy, such as a visible designator or infrared source, emitting radiation in a narrow spectral band.

2. Description of the Prior Art

Camera designers are constantly providing more sophisticated features while, at the same time, simplifying camera operation for both users and manufacturers. Automatic focusing is one such capability that is both common and diverse in its applications. Many technologies are employed, including sound based systems that measure travel time; and light based systems that use image position, sharpness, triangulation, or other focus dependent parameters.

Perhaps most pertinent to the present invention are focusing systems of the type disclosed in Hisashi Goto et al. U.S. Pat. No. 5,212,375, issued May 18, 1993. Their approach uses a holographic optical element positioned between the camera objective and its image plane. Most of the light focused by the objective passes essentially undisturbed through the holographic element to form the image. Some of the light is diffracted, however, and follows different paths leading to photodetectors displaced from the image plane. The position of the diffracted light on the photodetectors changes with the position of the objective and is used to detect focus. Adjustments are controlled with information that indicates both the direction and magnitude of movement required to properly position the objective. Goto does not leave the holographic optic on the optical axis during photographing and does not propose the use of a holographic optic in an independent module separate from the main photographing lens.

Another function pertinent to the present invention is camera pointing. Pointing aids typically include frames or other indicia in the camera viewfinder that identify the center and border of the desired picture. In many cameras, the viewfinder image is formed through the same camera lens that exposes the film, providing a common frame of reference and thereby eliminating parallax. Some of the more recent pointing aids, referred to as designators, employ lasers, light emitting diodes (LEDs) or other devices that direct a narrow beam of visible light substantially parallel to the camera optics. The light beam is pointed at the subject and visibly identifies the center of the desired picture. Examples of the last mentioned approach are disclosed in Capper U.S. Pat. No. 5,189,463, issued Feb. 23, 1993, and Capper PCT Publication No. WO 93/13452, published Jul. 8, 1993. The Capper publication includes an automatic focusing mechanism that may be operated at the same time as his designator.

PROBLEM SOLVED BY THE INVENTION

Automatic focusing mechanisms that use only ambient light must accommodate a very wide range of possible intensities. A dynamic range of ten to twenty thousand would not be unusual, given the potential range of ambient illumination and subject reflectivity. In addition to the range of intensities, a broad spectrum of background illumination covers the desired signal, making it difficult to attain a high signal-to-noise ratio. Similarly, there may be multiple objects in the detector field of view, still further increasing the likelihood of confusing the logic of the focusing system.

With an off axis diffractive or holographic optical element the ambient light is dispersed spectrally, first because the element acts like an optical grating and second because the focal length of the element is a function of wavelength. The element will blur the light both angularly and longitudinally. Focusing approaches that use the entire spectrum, such as disclosed in the above-referenced Goto patent, must accommodate the dispersion effects or suffer from dispersion induced inaccuracies, particularly in cameras with interchangeable lenses and multiple focal lengths.

Usually focus is determined by triangulation, or the focus-dependent position of a reflected spot on a photodetector. Although satisfactory in some applications, the photodetector must be large enough to intercept the spot in all positions, and include some additional mechanism, such as segmentation of the photodetector, for identifying the spot location. Higher precision means more segmentation and complexity.

Existing approaches typically use separate mechanisms for focus detection and pointing. The camera might be aimed at the intended scene, but not focused on the desired subject. Even with laser designators, the designating spot is not always coincident with the point of focus. Separate mechanisms mean redundant parts and manufacturing complexity.

SUMMARY OF THE INVENTION

The present invention is directed to overcoming one or more of the problems set forth above. Briefly summarized, according to one aspect of the invention, apparatus is provided for use with an imaging optical system having an adjustable focus, preferably to indicate both the direction and magnitude of focus adjustment. The apparatus includes a diffractive optical element exposed to a broad spectrum of radiation. The element filters out a narrow spectrum of the radiation and directs it to detectors in the focusing circuit, increasing the signal-to-noise ratio and reducing unwanted dispersion and other wavelength dependent effects. According to a more specific feature of the invention, two detectors are used in the focusing circuit, the radiation is centered on the detectors, and the focusing adjustment is determined by the difference in signal between the two detectors, eliminating absolute intensity and reflectivity from the focusing determination. Still another feature employs a holographic diffractive element transparent to most of the broad spectrum, but reflective to the narrow spectrum used for focusing. This permits positioning of the holographic element between the optical system and its focal plane without significantly degrading the focused image. The focusing element can remain in position during imaging.

The invention has particular utility when used in a camera having a designator, preferably a visible designator, emitting a narrow spectrum of radiation, and corresponding diffractive optical elements that filter out primarily the same narrow spectrum of radiation for use by the focusing mechanism. Two detectors are used in the preferred approach, positioned before and after the optimal focus, and the relative intensity of radiation on the detectors is used to indicate both the direction and magnitude of focusing adjustment.

According to still another feature of the invention, the designator is modulated, and the detector output signal is integrated only when the designator is on, further increasing the signal-to-noise ratio.

The invention is most advantages when several or all of the above features are combined in a photographic camera.

ADVANTAGEOUS EFFECTS OF THE INVENTION

The invention has many advantages depending on the combination of features employed. In its basic forms, it provides a relatively simple mechanism that is easy to use and to manufacture, yet produces a high signal-to-noise ratio for determining both the direction and magnitude of focus adjustment.

According to certain features of the invention, a source of energy emits radiation in a narrow spectrum. Energy returning to the photodetectors of the focusing mechanism is filtered to pass radiation primarily in the same narrow spectrum while removing other background wavelengths, thereby increasing the signal-to-noise ratio and reducing undesirable wavelength effects. This feature is further enhanced by modulating the energy of the source and integrating the resulting signal, e.g. the energy reflected from the subject, only during the time intervals that correspond to the modulated output. According to these features, a light emitting diode (LED), laser, or the like, might be pulsed for illuminating the subject, and the detection circuit would integrate the reflected energy only during the time intervals when the source is pulsed on. Further advantages are attained with this feature by using two detectors and comparing their output signals in a manor that removes the variability in subject reflectivity and absolute illumination provided by the source.

The preferred embodiment of the invention includes a diffracting optical element between the main optics of a camera and its focal plane. This embodiment has particular advantages. The optical element filters out the energy from the designator, so the element can remain in position during the picture taking operation without including the designator spot in the picture. It also uses the same optics employed in picture taking, and automatically corrects for focusing imperfections and variations in the optics.

According to other particularly advantages features of the invention, the illuminating source is a visible designator used for both pointing and ranging. This feature insures that the focus adjustment corresponds to the intended subject distance. Radiation from the designator or pointing device is the same radiation used for focusing, significantly reducing complexity in operation and manufacturing, while retaining a high degree of reliability.

These and other features and advantages of the invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
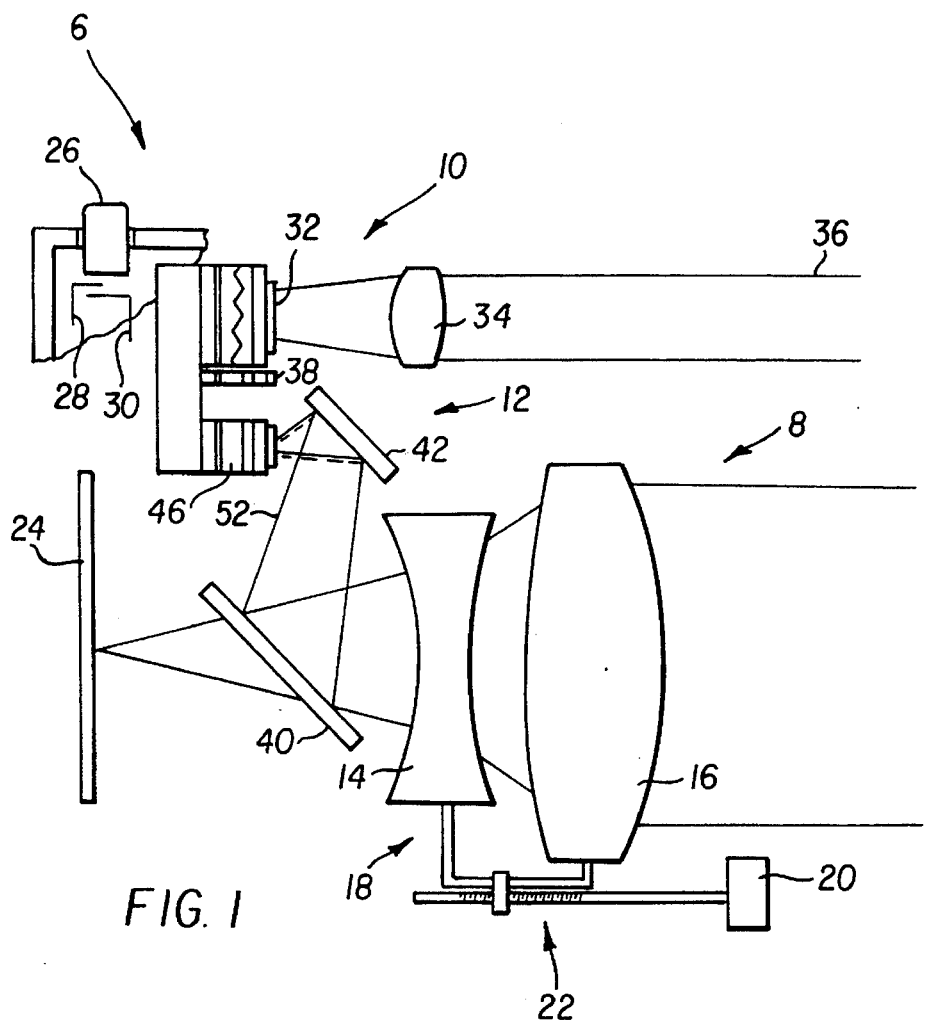
FIG. 1 is a schematic side view of a focusing mechanism in a photographic camera according to a preferred embodiment of the invention.
Figure 2:
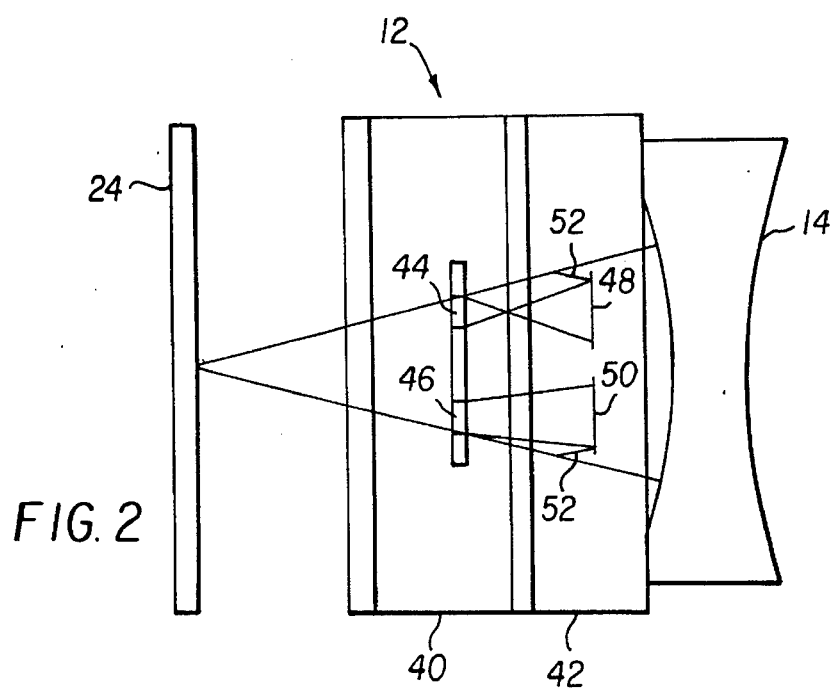
FIG. 2 is a schematic top elevation of the focusing mechanism of FIG. 1.

Referring now to the FIGS. 1 and 2, a preferred embodiment of the invention is illustrated in a camera 6 including imaging, pointing and focusing systems 8, 10 and 12, respectively. Although the systems can be somewhat independent, as will be described in connection with an alternative embodiment, many advantages result from their integration as depicted in this preferred embodiment.

The imaging system 10 is conventional in design, including a lens assembly 14 and 16 defining a camera objective 18. The objective 18 is adjustable by a stepper motor 20 and linkage 22 that move the objective axially, in either direction, to properly focus an image on plane 24. Although not specifically shown, the image plane 24 is defined by conventional and well known structure that locates a frame of photographic film in a position for exposure to the focused image.

The camera is automatic in its operation, and is actuated by a button 26 that is depressed to move through two positions engaging first and second switches 28 and 30, respectively. The first switch 28 activates the pointing system and initiates focus detection and adjustment. The second switch 30 activates the exposure operation.

The pointing system 10 projects a beam of light radiation in a wavelength and intensity suitable for visibly designating a subject to be photographed. A surface or side emitting indium-gallium-aluminum phosphide (In(GaAl)P) laser diode 32 is depicted in the preferred embodiment with a collimating lens 34. The laser is driven at one-half of a milliwatt (½ mw) and is modulated at one kilohertz (1 khz). The combination laser and lens projects a narrow beam 36 of radiation in wavelengths centered around six hundred and thirty nanometers (630 nm), with a bandwidth of approximately one to twenty nanometers (1–20 nm). For reasons that will become apparent hereinafter, the beam wavelengths are in a narrow spectrum that matches band-pass filtering components of the focusing system.

The output of the laser designator 32 is monitored by an adjacent photodetector 38, producing a signal representing the intensity of the laser beam.

The focusing system 12 determines both the direction and magnitude of adjustment required to properly focus the objective 18. The system includes two diffractive optical elements 40 and 42, and two photodetectors 44 and 46. The first diffractive optical element 40 is a holographic element that is transparent to a broad spectrum of radiation, but deflects a narrow spectrum or band of radiation, in this embodiment by reflection, into paths leading to the photodetectors. The second diffractive optical element 42 also is a holographic element, but includes two segments 48 and 50 that both reflect and focus the designator radiation. The segments 48 and 50 have different focal lengths, segment 48 imaging the designator beam in front of its photodetector 44 and segment 50 imaging the designator beam behind its photodetector 46. When the camera objective is properly focused, the photodetectors are positioned axially in the middle between the near and far focus points and the output of the detectors is equal.

The properties and methods of manufacturing holographic optical elements of the type used in the preferred embodiment are known in the prior art. Examples include the disclosure in my U.S. Pat. No. 5,039,183, issued Aug. 13, 1991; and an article entitled "Designing and Constructing Thick Holographic Optical Elements," published in Applied Optics, Volume 17, Number 8, dated Apr. 15, 1978. The disclosures of the last mentioned patent and publication hereby are incorporated by reference into this specification.

Figure 3:
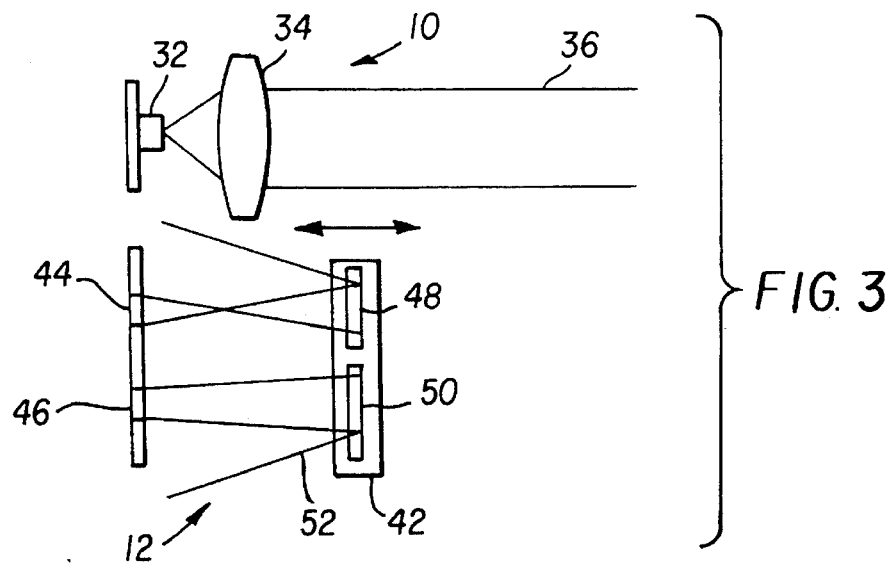
FIGS. 3–5 are schematic representations of the focusing mechanism in three positions: in focus, too close, and too far, respectively.
Figure 4:
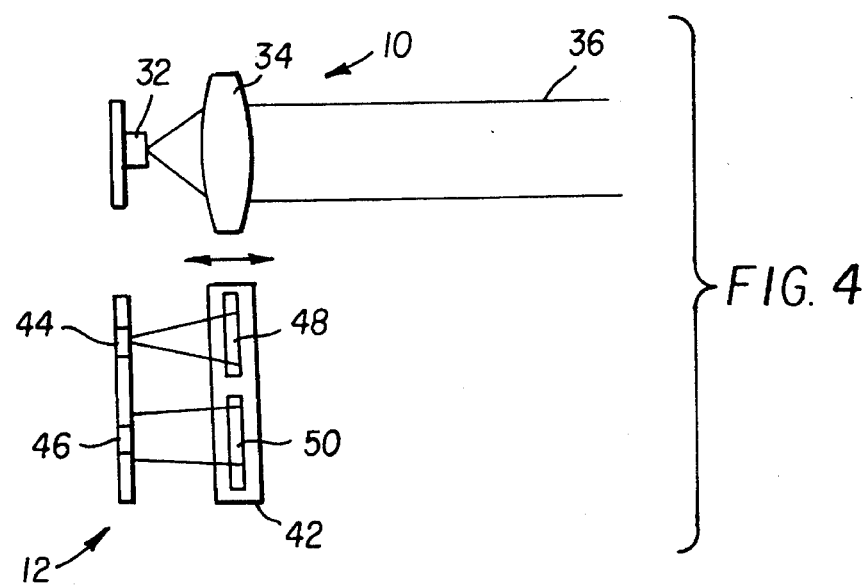
Figure 5:
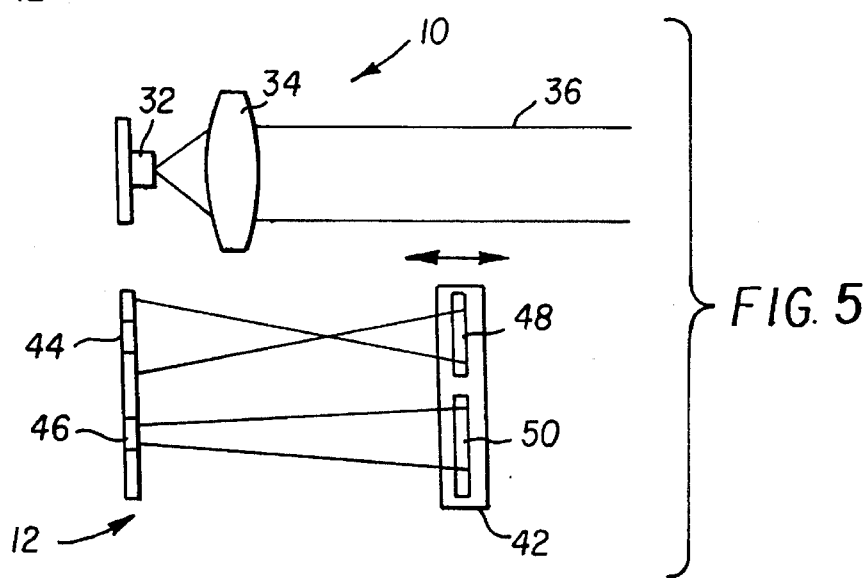

FIGS. 3–5 depict the operation of the focusing system. In all three Figures, visible radiation 36, from the laser designator 32, is reflected from the designated subject, returned through the camera objective and reflected by the first holographic element 40 into a path 52 (FIG. 3) leading to the second holographic element 42. The two segments 48 and 50 of the second holographic element 42 then reflect and focus the radiation as mentioned above. When the camera objective is properly focused, as depicted in FIG. 3, the size of the blur spots on the respective photodetectors, and therefore the intensities, are equal because the focus points of holographic segments 48 and 50 are equally spaced axially before and after the photodetectors 44 and 46.

FIG. 4 depicts an out of focus condition in which the camera objective is too close to the image plane for the subject distance. Photodetector 44 intercepts more of the reflected radiation than photodetector 46, producing a relatively larger output signal. The sign of the difference in output signals of the two photodetectors is used to indicate the direction of focus adjustment required, while the magnitude of the difference indicates the amount of adjustment.

FIG. 5 represents an out of focus condition in the opposite direction, where the objective is too far from the image plane for the subject distance. In this case photodetector 46 intercepts more of the reflected radiation and produces the relatively larger signal, again indicating the direction and magnitude of focus adjustment required.

Figure 6:
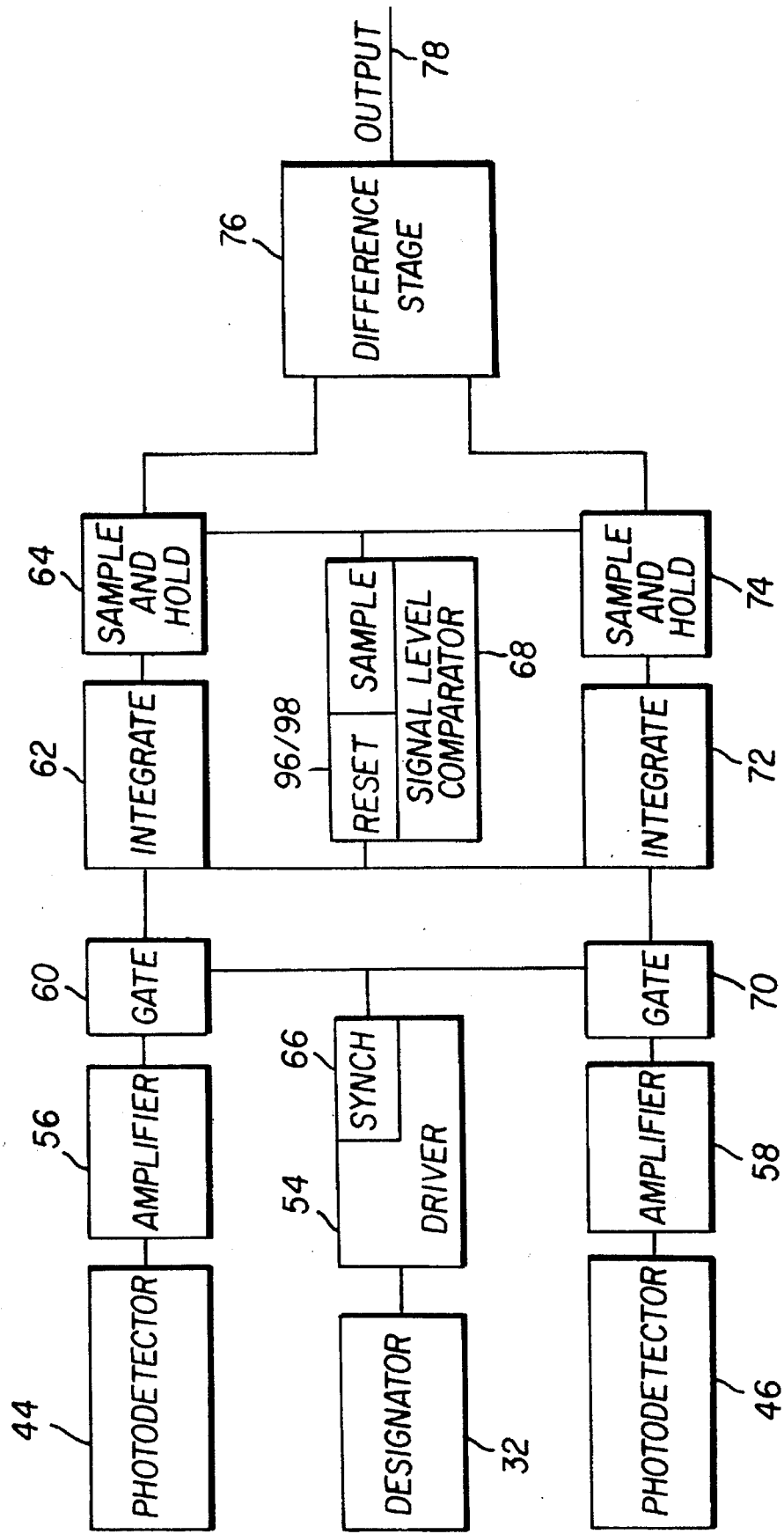
FIG. 6 is a block diagram representing the electrical circuit used in the preferred focusing mechanism of FIG. 1.

FIG. 6 is a block diagram of an electrical circuit for use with the pointing and focusing systems 10 and 12. A driver 54 powers and modulates the designator 32 at a frequency of one kilohertz (1 khz). Designator energy is reflected from the subject and the reflected energy is transformed into a proportional electrical signal by photodetectors 44 and 46. The output signals from the photodetectors are amplified at 56 and 58, respectively, and processed in separate channels for comparison to establish a differential output. Using the first channel for this description, the amplified output of photodetector 44 is gated at 60 to an integrator 62 and a sample and hold circuit 64. Gating is controlled by a synchronizer 66, coupled to designator driver 54, so the duty cycle or integrating period of integrator 62 is matched to the on period of the laser designator 32. Noise is reduced, and the signal-to-noise ratio increased, by integrating the amplified photodetector signal only when the laser designator is on.

Integration of the amplified signal continues over many pulses of the laser until the integrated value in either channel reaches some predetermined level, such as three volts, determined by comparator 68. It is then saved in the sample and hold circuit 64. At the same time, the integrated signal from the second channel, 46, 58, 70, 72, and 74, is sampled and saved. The two channels are then compared and subtracted in stage 76, and the difference between the channels is provided as an output signal 78 representing the direction and magnitude of focus adjustment required for the camera objective.

In summary, the amplified output signal from each photodetector 44 and 46 is gated at the same phase and frequency as the laser modulation, so the signal is integrated only when the laser is on. Integration continues for a number of cycles until the integrated value in either one of the channels reaches a level that is optimal for processing. At that point the integrated values are compared between the channels and subtracted to provide a focus correcting signal that is independent of the absolute illumination from the laser and the reflectivity of the subject. The output voltage can be analog or digital, in the latter case simplifying its application to a camera control microprocessor.

Figure 7:
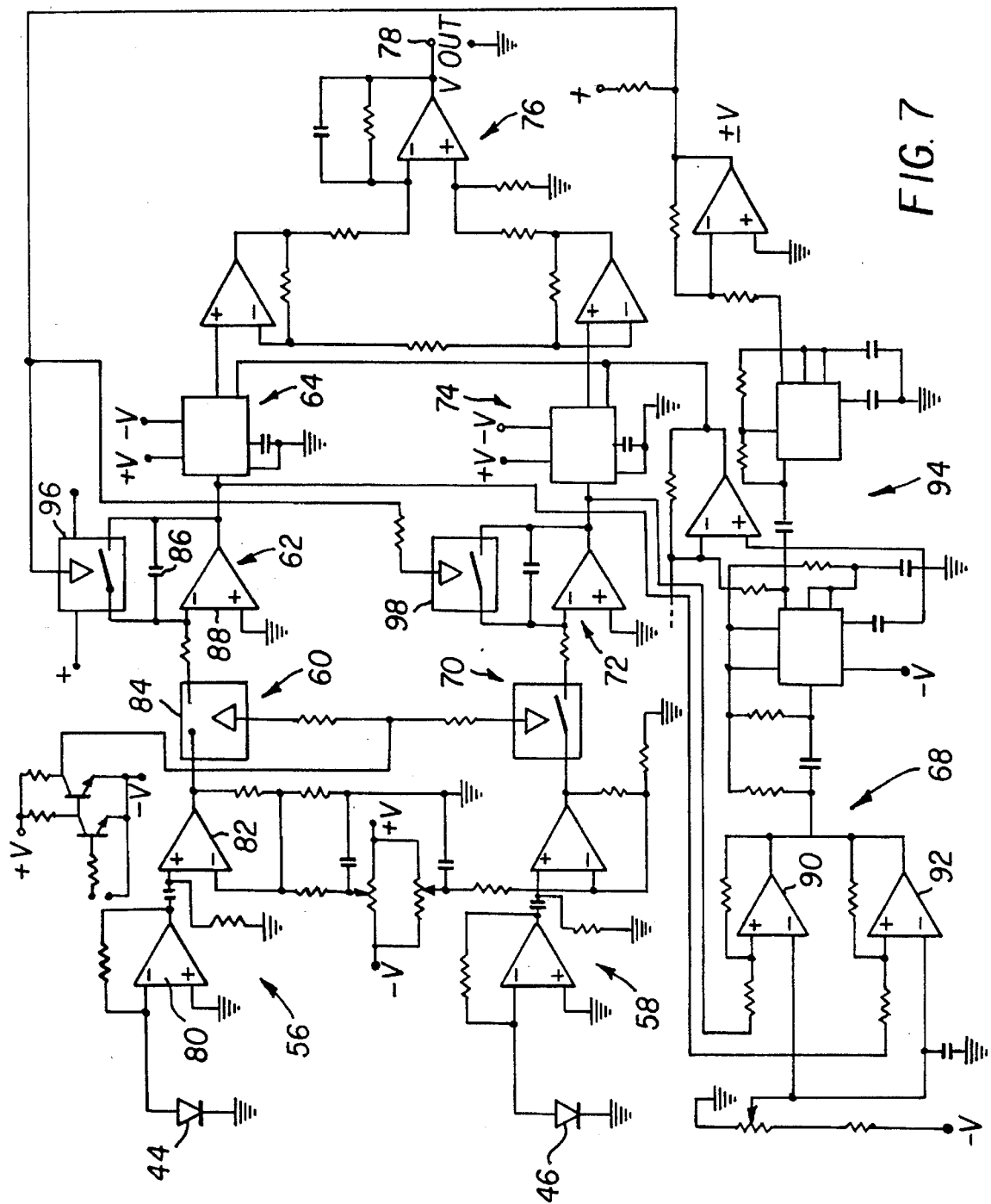
FIG. 7 is a schematic electrical diagram corresponding to the block diagram of FIG. 6.

A schematic diagram of the focusing system circuit is presented in FIG. 7. The signal from photodetector 44 is amplified in two stages comprising first and second operational amplifiers 80 and 82, respectively. The amplified signal is gated by a transistor switch 84, synchronized with the designator driver 54 to pass the amplified signal to integrator 62 only when the designator is on. The integrator includes capacitor 86 in the feedback loop of operational amplifier 88. Similar components make up the second channel, including photodetector 46, amplifier 58, gate 72 and integrator 72.

The integrated signal level in both channels is monitored by comparators 90 and 92. When it reaches the predetermined level in either channel, sample and hold circuits 64 and 74 are actuated to save the level in both channels. Section 94 includes one shot timers that condition the signal from the comparators for operating the sample and hold circuits and, with some delay, then resetting the integrators through transistor switches 96 and 98.

The signal levels in sample and hold devices 64 and 74 are subtracted, one from the other, at the differencing stage 78, and provided as a voltage output 78 indicating the channel having the highest signal and the magnitude of the difference. This voltage output represents the direction and magnitude of focus adjustment required to properly set the camera objective.

Figure 8:
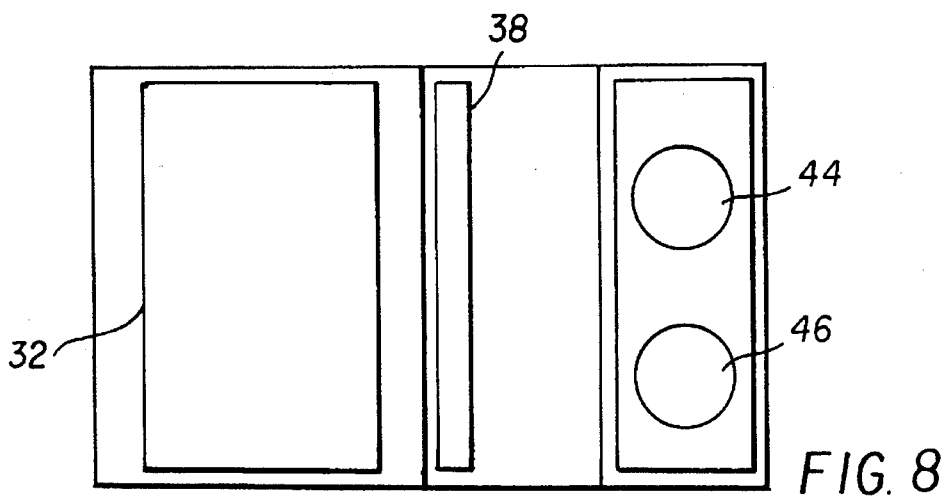
FIGS. 8 and 9 are top and side elevation views, respectively, of a single chip including a laser diode and two photodetectors for use in the focusing mechanism of FIG. 1.
Figure 9:
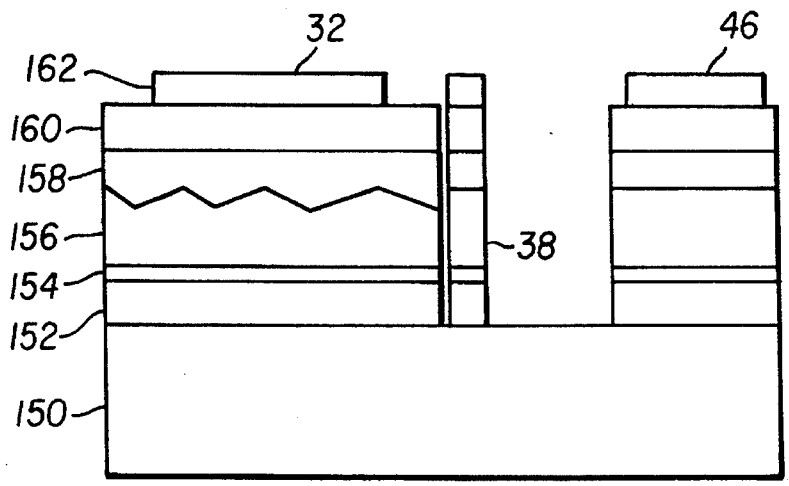

FIGS. 8 and 9 represent a single chip including the designating laser diode 32, the laser intensity monitor 38, and the two detecting photodetectors 44 and 46. The laser diode is fabricated first, and then the wafer is coated with a mask to protect the above-mentioned elements while the intermediate material, between the protected elements, is etched back to the substrate. The stack is then reverse biased in the three areas intended as the photodetectors.

The depicted example is a surface emitting distributed feedback (DFB) laser grown on a Gallium Arsenide (GaAs) substrate 150, which incorporates an N type indium gallium aluminum phosphide (In(GaAl)P) cladding layer 152, an (InGaP/In(GaAl)P) quantum well active layer 154, and a P type (In(GaAl)P) separate confinement layer 156. A second order distributed feedback grating 158 is formed on the confinement layer 156, and is overgrown with a p type (In(GaAl)P) cladding layer 158 and a P type GaAs contact layer 160. The surface emitting electrode is represented at 162. Although a surface emitting laser is depicted, edge emitting lasers, light emitting diodes and other visible emitters also might be employed according to this preferred embodiment. Infra red and non-visible emitters also might be employed, and will be described in connection with an alternative embodiment.

Figure 10:
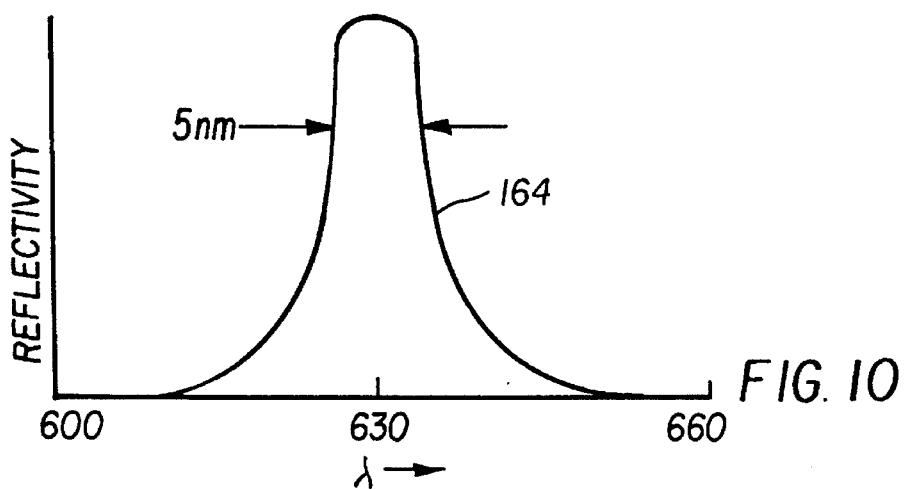
FIG. 10 is a graphical representations of reflectivity versus wavelength for holographic optical elements used with the focusing mechanism of FIG. 1.

As previously mentioned, the holographic optical element 40 is essentially transparent to a broad spectrum of radiation, but reflects a narrow spectrum into the path leading to the photodetectors 44 and 46. This narrow spectrum is represented by FIG. 10, which plots reflectivity of the holographic optical element versus wavelength. The band 164 of reflected wavelengths are centered at six hundred and thirty nanometers (630 nm) with a preferred bandwidth of approximately five nanometers (5 nm). The emitting wavelengths of the laser designator are centered in this same band to provide the highest signal-to-noise ratio for focusing.

Since the holographic element 40 is reflective only in a narrow band of wavelengths, only a very small and unnoticeable portion of the spectrum is removed from the image. Accordingly, it is possible to leave the holographic element in position during picture taking, thereby substantially simplifying camera operation.

DESCRIPTION OF ALTERNATIVE EMBODIMENTS

Figure 11:
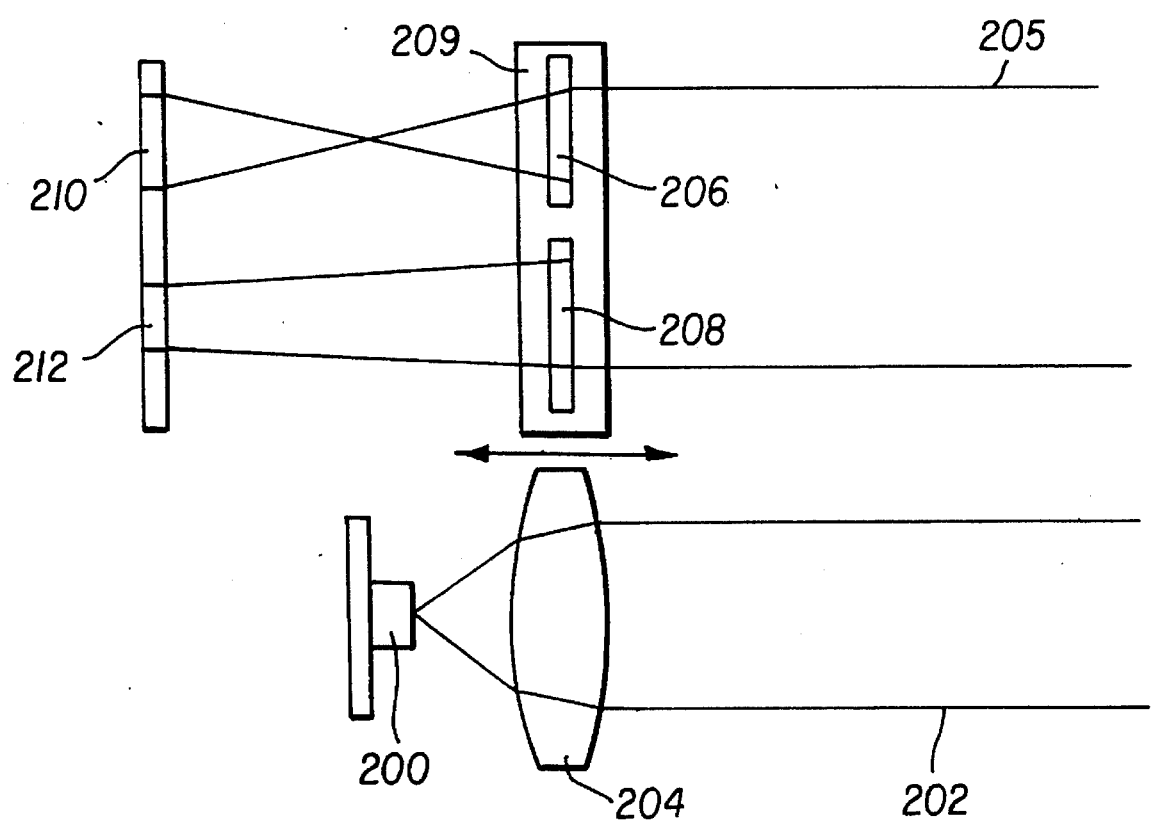
FIG. 11 is a schematic diagram of an alternative focusing mechanism packaged as a separate module that can be added to a camera to provide a focus correcting signal.

An alternative embodiment of the invention is depicted in FIG. 11. This embodiment is similar to the preferred embodiment in many respects, but differs primarily in the use of an infra-red source that is not visible, and its packaging as a separate module that is added to a camera to provide a focusing signal.

In this embodiment a light emitting diode (LED) or laser 200 emits an infra-red beam 202 through a collimator 204. Two diffractive lenses 206 and 208 serve as filters that focus only the infra-red wavelengths on the photodetectors 210 and 212, to increase the signal-to-noise ratio for focusing.

An infra-red laser having particular utility with this alternative embodiment is disclosed in my U.S. Pat. No. 5,070,509, issued Dec. 3, 1991, which hereby is incorporated by reference into the present specification.

While the invention has been described in connection with preferred an alternative embodiments, other modifications and applications will occur to those skilled in the art. The claims should be interpreted to fairly cover all such modifications and applications within the true spirit and scope of the invention.

PARTS LIST FOR FIGURES

| Reference No. | Part |
| --- | --- |
| 6 | Camera. |
| 8 | Imaging system. |
| 10 | Pointing system. |
| 12 | Focusing system. |
| 14 & 16 | Lens assembly. |
| 18 | Objective. |
| 20 | Stepper motor. |
| 22 | Linkage. |
| 24 | Image plane. |
| 26 | Actuation button. |
| 28 | First switch. |
| 30 | Second switch. |
| 32 | Laser diode. |
| 34 | Collimating lens. |
| 36 | Narrow beam. |
| 38 | Monitoring photodetector. |

-continued

PARTS LIST FOR FIGURES

| Reference No. | Part |
| --- | --- |
| 40 | Diffractive optical element. |
| 42 | Diffractive optical element. |
| 44 | Photodetector. |
| 46 | Photodetector. |
| 48 | Segment. |
| 50 | Segment. |
| 52 | Path. |
| 54 | Driver. |
| 56 | Amplifier. |
| 58 | Amplifier. |
| 60 | Gate. |
| 62 | Integrator. |
| 64 | Sample and hold circuit. |
| 66 | Synchronizer. |
| 68 | Comparator. |
| 70, 72, 74 | Second channel. |
| 76 | Differentiating stage. |
| 78 | Output signal. |
| 80 | Operational amplifier. |
| 82 | Operational amplifier. |
| 84 | Transistor switch. |
| 86 | Capacitor. |
| 88 | Operational amplifier. |
| 90 | Comparator. |
| 92 | Comparator. |
| 94 | Section. |
| 96 | Transistor switch. |
| 98 | Transistor switch. |
| 150 | Substrate. |
| 152 | Cladding layer. |
| 154 | Active layer. |
| 156 | Confinement layer. |
| 158 | Grating. |
| 160 | Contact layer. |
| 162 | Electrode. |
| 164 | Wavelength band. |
| 200 | LED or laser. |
| 202 | infra-red beam. |
| 204 | Collimator. |
| 206 | Diffractive lens. |
| 208 | Diffractive lens. |
| 210 | Photodetector. |
| 212 | Photodetector. |

What is claims is:

1. Apparatus for use with an imaging optical system having an adjustable focus; said apparatus comprising:

an opto-electronic transducer providing an electrical signal proportional to characteristics of radiation on said transducer;

a volume holographic optical element exposed to a broad wavelength spectrum of radiation, said volume holographic optical element filtering radiation from said broad wavelength spectrum primarily into a narrow wavelength spectrum and directing said narrow wavelength spectrum of radiation into a path centered on said transducer; and, means responsive to the signal from said transducer for providing a focusing signal to the optical system.

2. The invention of claim 1, further including:

a second opto-electronic transducer providing a second electrical signal proportional to characteristics of radiation on said second transducer;

a diffractive optical element exposed to said narrow spectrum of radiation, said diffractive optical element focusing said narrow spectrum of radiation centered on said transducer and said second transducer; and, means comparing said electrical signal and said second electrical signal for providing both a direction and a magnitude signal indicative of proper focus of the optical system.

3. The invention of claim 2, including a radiation emitter issuing a beam of radiation primarily in said narrow spectrum.

4. The invention of claim 3, wherein said radiation emitter is a laser issuing a visible beam of radiation.

5. Apparatus for use with an imaging optical system; said apparatus comprising:

a laser designator for issuing a beam of radiation in a narrow spectrum of wavelengths;

a radiation detector sensitive to radiation including said narrow spectrum;

a diffractive optical element for filtering radiation primarily in said narrow spectrum and focusing said narrow spectrum of filtered radiation on said detector; and, means for providing a signal indicative of proper focus of the optical system based at least in part on properties of said narrow spectrum of radiation sensed by said detector.

6. The invention of claim 5, wherein said diffractive optical element is a holographic optical element.

7. The invention of claim 5, including:

a second radiation detector sensitive to radiation including said narrow spectrum;

a second diffractive optical element for focusing said narrow spectrum of radiation on said detector and said second detector; and, wherein said means for providing a signal bases the signal on relative properties of said narrow spectrum of radiation sensed by said detector and said second detector, respectively.

8. The invention of claim 7, wherein said signal providing means includes means for determining both direction and degree of correction required for said focus setting.

9. A camera comprising:

means defining an image plane;

an optical system forming an image by focusing a broad wavelength spectrum of radiation onto the image plane;

a mechanism including a radiation detector for setting a camera parameter based on selected properties of at least a portion of said radiation; and, a radiation deflecting element between said optical system and the image plane, said element transmitting most of the broad wavelength spectrum to form the image and deflecting a narrow wavelength spectrum of said radiation into a path leading to said detector.

10. The invention of claim 9, wherein said radiation deflecting element is a holographic element transparent to most of said broad spectrum and reflective to said narrow spectrum.

11. The invention of claim 9, wherein said mechanism focuses said optical system based at least in part on the intensity of said narrow-spectrum on said detector.

12. The invention of claim 11, wherein said narrow spectrum is infra-red.

13. Apparatus for setting proper focus in a broad-spectrum imaging optical system; said apparatus comprising:

a designator issuing a beam of radiation in a narrow spectrum for pointing to an object to be imaged by said broad spectrum optical system;

a radiation detector sensitive to radiation including said narrow spectrum;

a diffractive optical element for filtering radiation primarily in said narrow spectrum and focusing said narrow spectrum of radiation centered on said detector; and, means for providing a signal indicative of the proper focus of the optical system based at least in part on the intensity of said narrow spectrum of radiation on said detector.

14. The invention of claim 13, wherein said designator is an infra-red laser.

15. A photographic camera comprising:

means for supporting a recording medium in an image plane;

an optical system having an optical axis and for focusing a broad spectrum of visible radiation on the recording medium in the image plane;

a narrow spectrum designator for issuing a beam of radiation in a narrow spectrum substantially parallel to the optical axis;

a focusing mechanism including a detector sensitive to said narrow spectrum for setting camera focus based on the intensity of radiation from said designator reflected by the object; and, a holographic element between said optical system and the image plane, said element transmitting most of said broad spectrum of radiation to form the image and reflecting said narrow-spectrum of said radiation into a path leading to said detector.

16. The invention of claim 15, wherein said designator includes a laser, and said narrow spectrum is visible.

17. A photographic camera comprising:

a film plane including means for supporting photographic film;

an optical system for focusing a broad spectrum of visible radiation onto the film in the image plane, said optical system having an optical axis;

a narrow spectrum designator for issuing a beam of visible radiation approximately parallel to the optical axis for pointing the system at an object;

first and second detectors each sensitive to said narrow spectrum;

holographic means between said optical system and the image plane, said holographic means transmitting most of said broad spectrum of radiation to form the image and reflecting said narrow-spectrum of said radiation into paths leading to said first and second detectors; and, a focusing mechanism including means for focusing said optical system based on the relative intensity of the radiation on said first and second detectors, respectively.

18. A photographic camera having an adjustable focus; said camera comprising:

a designator for projecting a beam of visible radiation onto a designated subject, said beam including wavelengths and having an intensity suitable for pointing the camera in daylight;

an intensity detector sensitive to the designator beam wavelengths and configured to receive radiation reflected from the designated subject; and, a focusing mechanism including means for isolating and using the detected intensity of the reflected designator beam for adjusting the camera focus.

19. A photographic camera having an adjustable focus; said camera comprising:

a designator for projecting a beam of visible radiation onto a designated subject, said beam including wavelengths and having an intensity suitable for pointing the camera in daylight;

first and second photodetectors sensitive to the designator beam wavelengths for providing first and second output signals, respectively, representing the intensity of radiation in said wavelengths on said first and second detectors;

means for directing radiation reflected from the subject into first and second paths, and for focusing said reflected radiation in front of said first photodetector in said first path and behind said second photodetector in said second path; and, a focusing mechanism using the difference in the first and second output signals for adjusting the camera focus.

20. The invention of claim 19, wherein said designator is a laser designator, and said directing means includes a filter for limiting the wavelengths in said first and second paths primarily to the wavelengths of said designator.

21. The invention of claim 20, wherein said camera includes an objective lens and a focal plane, said directing means is a holographic element positioned between the objective lens and said focal plane, and said holographic element is transmissive to a broad spectrum of wavelengths, but is reflective to said wavelengths of said designator.

22. A method of providing a signal for focusing on a subject a camera optical system: said method comprising:

directing a pulsed beam of optical energy in a narrow band of wavelengths at the subject;

sensing the energy reflected by the subject in said narrow band and producing an electrical signal proportional to the sensed energy;

integrating said electrical signal in a plurality of time segments synchronized to the pulses of said energy beam;

providing an output signal for focusing the optical system, said output signal depending on said integration of said electrical signal.

23. The invention of claim 22, wherein said pulsed beam is visible, and including the further step of filtering the sensed energy to exclude energy in wavelengths outside said narrow band.

24. A method of providing a signal for focusing on a subject a camera optical system: said method comprising:

directing a pulsed beam of optical energy in a narrow band of wavelengths at the subject;

focusing energy reflected by the subject into first and second paths having different focal lengths;

sensing the reflected energy in said first and second paths and producing first and second electrical signals, respectively, proportional to the sensed energy in said first and second paths;

integrating said first and second electrical signals over a plurality of time segments synchronized to the pulses of said energy beam:

providing an output signal for focusing the optical system, said output signal depending on the difference between the integrated first and second electrical signals.

25. Apparatus for providing a camera focusing signal; said apparatus comprising:

an emitter of modulated optical energy;

a photodetector for sensing the energy reflected by the subject and producing an electrical signal proportional to the sensed energy;

a gated integrating circuit for integrating said electrical signal in a plurality of spaced time segments synchronized to the modulation of said optical energy, and;

means providing an output signal for focusing, said output signal depending on said integrated electrical signal.

26. Apparatus providing a signal for focusing on a subject a camera optical system: said apparatus comprising:

means for directing pulses of optical energy at the subject;

means for focusing the optical energy reflected by the subject into first and second paths having different focal lengths;

first and second photodetectors in said first and second paths, respectively, for producing first and second electrical signals proportional to the reflected energy in said first and second paths;

a gated integrating circuit for integrating said first and second electrical signals over a plurality of time segments synchronized to the pulses of said optical energy; and, means providing an output signal for focusing the optical system, said output signal depending on the difference between the integrated first and second electrical signals.

27. A camera comprising an autofocus system which receives radiation reflected at least from a predetermined portion of a subject to be photographed to focus a taking lens with respect to the subject, and aiming means for impinging a visible light-spot on the subject to ensure said taking lens is pointed towards the subject, is characterized in that:

said aiming means is constructed to impinge the visible light-spot on the subject only within the predetermined portion of the subject.

* * * * *